(12) United States Patent
Huang (10) Patent No.: US 6,733,044 B2
(45) Date of Patent: May 11, 2004

(54) DEVICE FOR LINKING FLUID-CONDITIONING UNITS

(76) Inventor: Yin Hsiang Huang, No. 492-1, Sec. 1, Wan Shou Rd., Kwei Shan Hsiang, Taoyuan Hsien (TW)

(*) Notice: Subject to any disclaimer, the term of this patent is extended or adjusted under 35 U.S.C. 154(b) by 54 days.

(21) Appl. No.: 10/147,890

(22) Filed: May 20, 2002

(65) Prior Publication Data

US 2003/0038479 A1 Feb. 27, 2003

(30) Foreign Application Priority Data

Aug. 24, 2001 (TW) .......................................... 90214569

(51) Int. Cl.[7] .................................................. F16L 39/00
(52) U.S. Cl. ................................ 285/124.1; 285/124.5; 285/124.4
(58) Field of Search .......................... 285/124.1, 124.2, 285/124.5, 124.3, 124.4, 364

(56) References Cited

U.S. PATENT DOCUMENTS

| | | | | |
|---|---|---|---|---|
| 3,538,940 A | * | 11/1970 | Graham | 285/125.1 |
| 3,560,027 A | * | 2/1971 | Graham | 285/130.1 |
| 4,070,045 A | * | 1/1978 | Colter et al. | 285/325 |
| 4,289,335 A | * | 9/1981 | Olbermann | 285/91 |
| 4,352,511 A | * | 10/1982 | Ribble et al. | 285/91 |
| 4,533,020 A | * | 8/1985 | Yamazaki | 285/325 |
| 4,782,852 A | * | 11/1988 | Legris | 137/269 |
| 5,383,689 A | * | 1/1995 | Wolfe, Sr. | 285/124.3 |
| 6,036,107 A | * | 3/2000 | Aspen et al. | 239/170 |
| 6,039,358 A | * | 3/2000 | Stoll et al. | 285/23 |
| 6,206,045 B1 | * | 3/2001 | Hayashi et al. | 137/884 |
| 6,237,634 B1 | * | 5/2001 | Narita et al. | 137/625.27 |
| 6,425,416 B1 | * | 7/2002 | Narita et al. | 285/26 |

* cited by examiner

Primary Examiner—David Bochna
(74) Attorney, Agent, or Firm—Troxell Law Office PLLC (57) ABSTRACT

A device for sealingly connecting together a pair of fluid-conditioning units such as pressure regulators, filters, and lubricators used in compressed air systems comprises a plurality of body units each having two opposite side apertures, two external coupling mechanisms wherein one external coupling mechanisms has one end fastened in one side aperture of the first one of the body units and the other end thereof linked to a pipe, and the other external coupling mechanism has one end fastened in one side aperture of the last one of the body units and the other end thereof linked to another pipe, and one or more internal coupling mechanisms each fastened between the other side apertures of two adjacent body units. The invention can couple to a variety of pipes of the fluid-conditioning units by simply replacing the original external coupling mechanisms with new ones having mated sizes.

6 Claims, 8 Drawing Sheets

DEVICE FOR LINKING FLUID-CONDITIONING UNITS

BACKGROUND OF THE INVENTION

1. Field of the Invention

The present invention relates to a device for linking fluid-conditioning units and more particularly to an improved device for contiguously connecting together a pair or a plurality of fluid flow elements, especially but not exclusively fluid-conditioning units, such as pressure regulators, filters and lubricators for use in compressed air systems.

2. Description of Related Art

Figure 7:
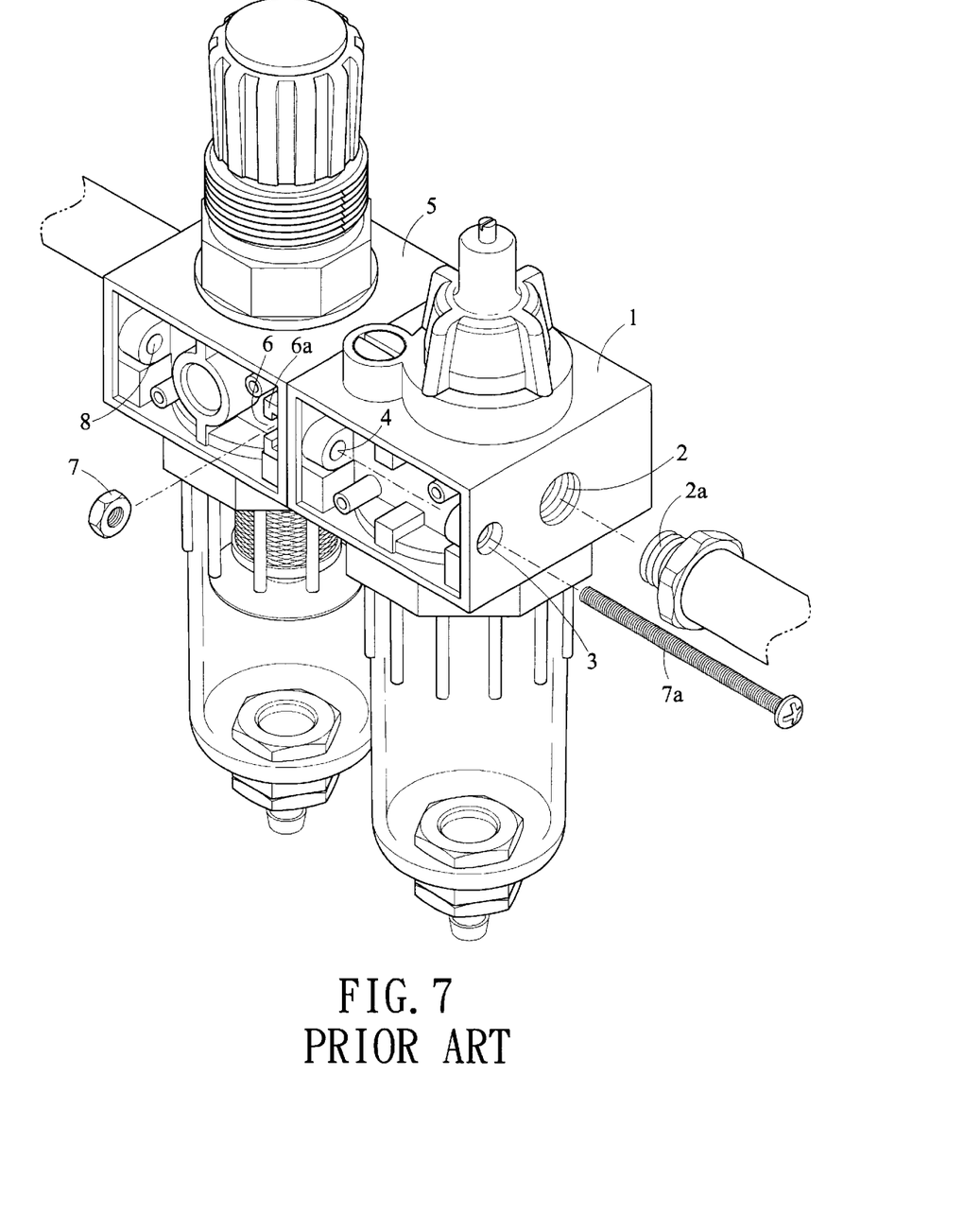
FIG. 7 is an exploded perspective view of a conventional device for linking fluid-conditioning units.

A conventional device for linking fluid-conditioning units is shown in FIG. 7. The device comprises a metal body unit 1 having a threaded hole 2 formed by machining directly therein. As such, the threaded hole 2 is not replaceable when it is worn out. Further, it is often found that the threaded hole 2 having a diameter scaled by the metric system cannot mate with an end of a pipe scaled by the British system. Hence, in this case the body unit 1 has to be replaced completely.

Moreover, in assembly of the body unit 1 and another body unit 5 having a construction different from that of the body unit 1, a receiving member 6a is required in the body unit 5 for anchoring a nut 7 of a bolt 7a which is driven through apertures 3, 4 of the body unit 1 and apertures 6 and 8 of the body unit 5. In view of above, the device is not easily adapted to implement.

Figure 8:
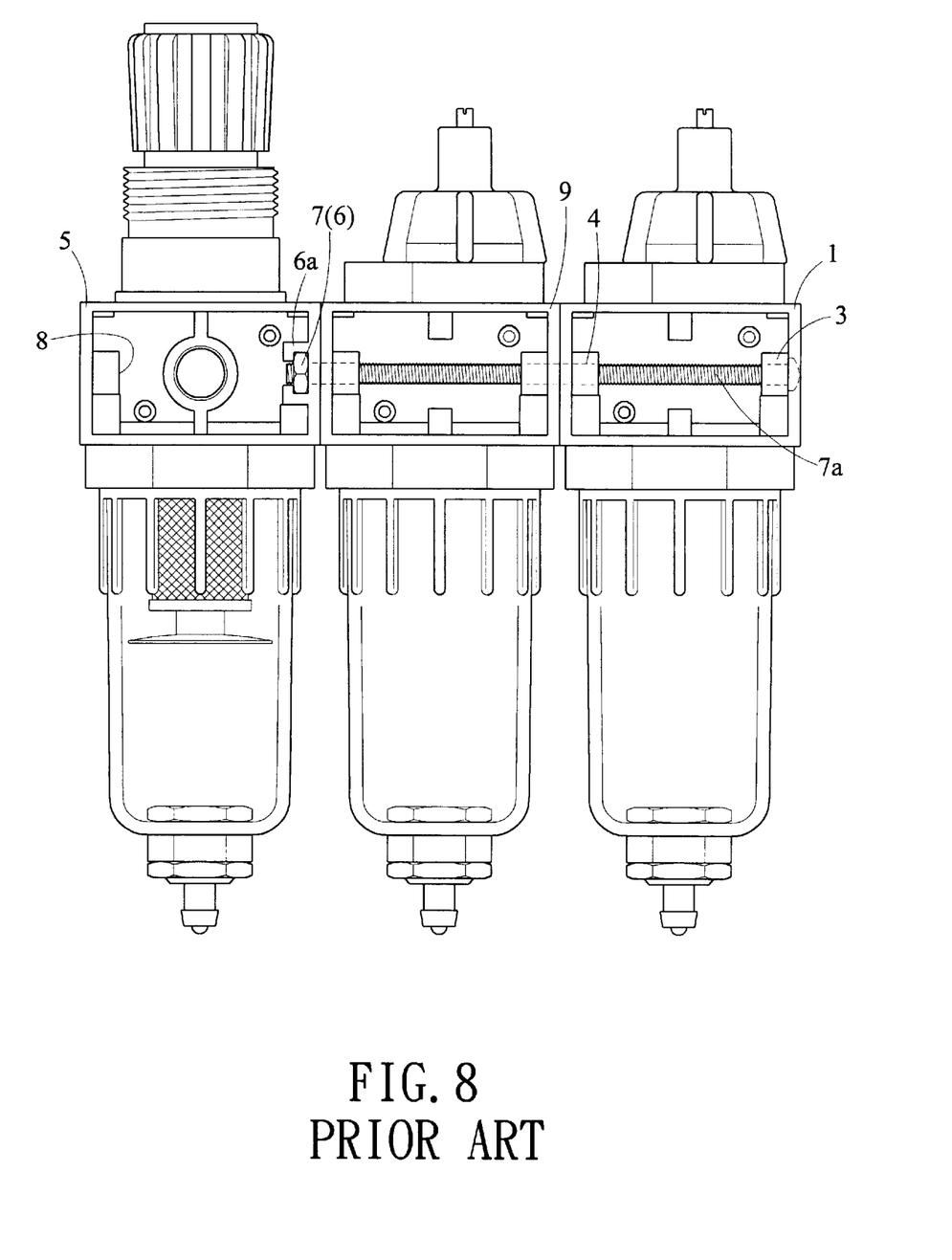
FIG. 8 is a side view of another conventional device for linking fluid-conditioning units.

Another conventional device containing three body units 1, 5, and 9 is shown in FIG. 8 wherein the body unit 9 is fastened between the body units 1 and 5. It is disadvantageous for being not easily adapted to assemble and excessive components. Thus, it is desirable to provide an improved device for fluid-conditioning units in order to overcome the above drawbacks of prior art.

SUMMARY OF THE INVENTION

It is an object of the present invention to provide a device for contiguously connecting together a pair of or a plurality of fluid-conditioning units, the device comprising a plurality of body units each having two opposite side apertures, two external coupling mechanisms wherein one external coupling mechanisms has one end fastened in one side aperture of the first one of the body units and the other end thereof linked to a pipe, and the other external coupling mechanism has one end fastened in one side aperture of the last one of the body units and the other end thereof linked to another pipe, and one or more internal coupling mechanisms each fastened between the other side apertures of two adjacent body units. The invention can couple to a variety scales of pipes of the fluid-conditioning units by simply replacing the original external coupling mechanisms with new ones having mated sizes.

In one aspect of the present invention, further comprises an O-ring inserted into the side apertures of each body unit wherein each body unit further comprises two fastening members and a first and a second top and bottom recesses relative to each side aperture with each fastening member secured in the top and bottom recesses. Thus, in an operation of replacing the external coupling mechanisms and the internal coupling mechanisms, it is done by simply removing the fastening members from the first and second top and bottom recesses.

The above and other objects, features and advantages of the present invention will become apparent from the following detailed description taken with the accompanying drawings.

DETAILED DESCRIPTION OF THE PREFERRED EMBODIMENTS

Figure 1:
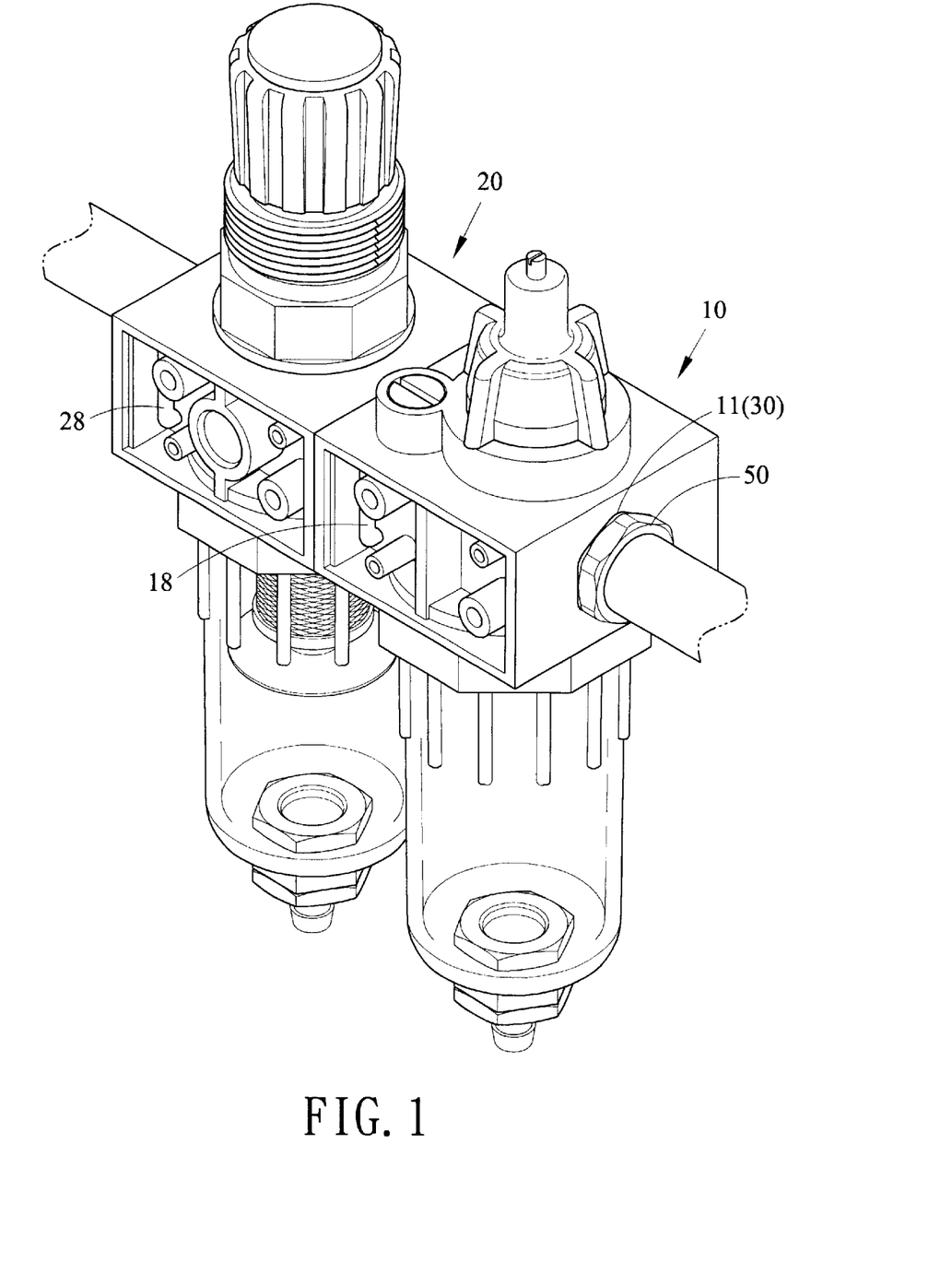
FIG. 1 is a perspective view of a first preferred embodiment of linking device according to the invention.
Figure 2:
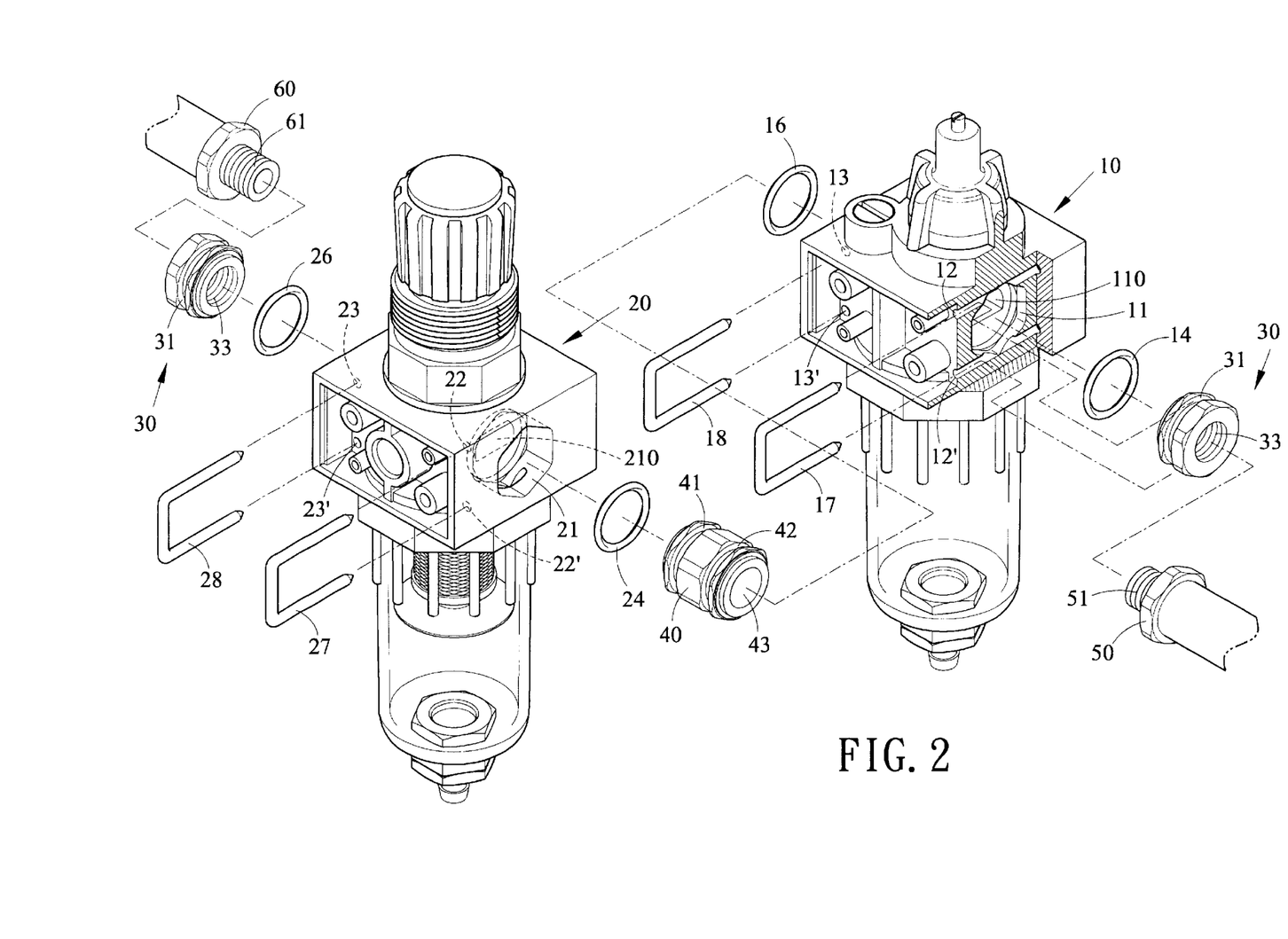
FIG. 2 is an exploded perspective view in part section of the FIG. 1 device.
Figure 3:
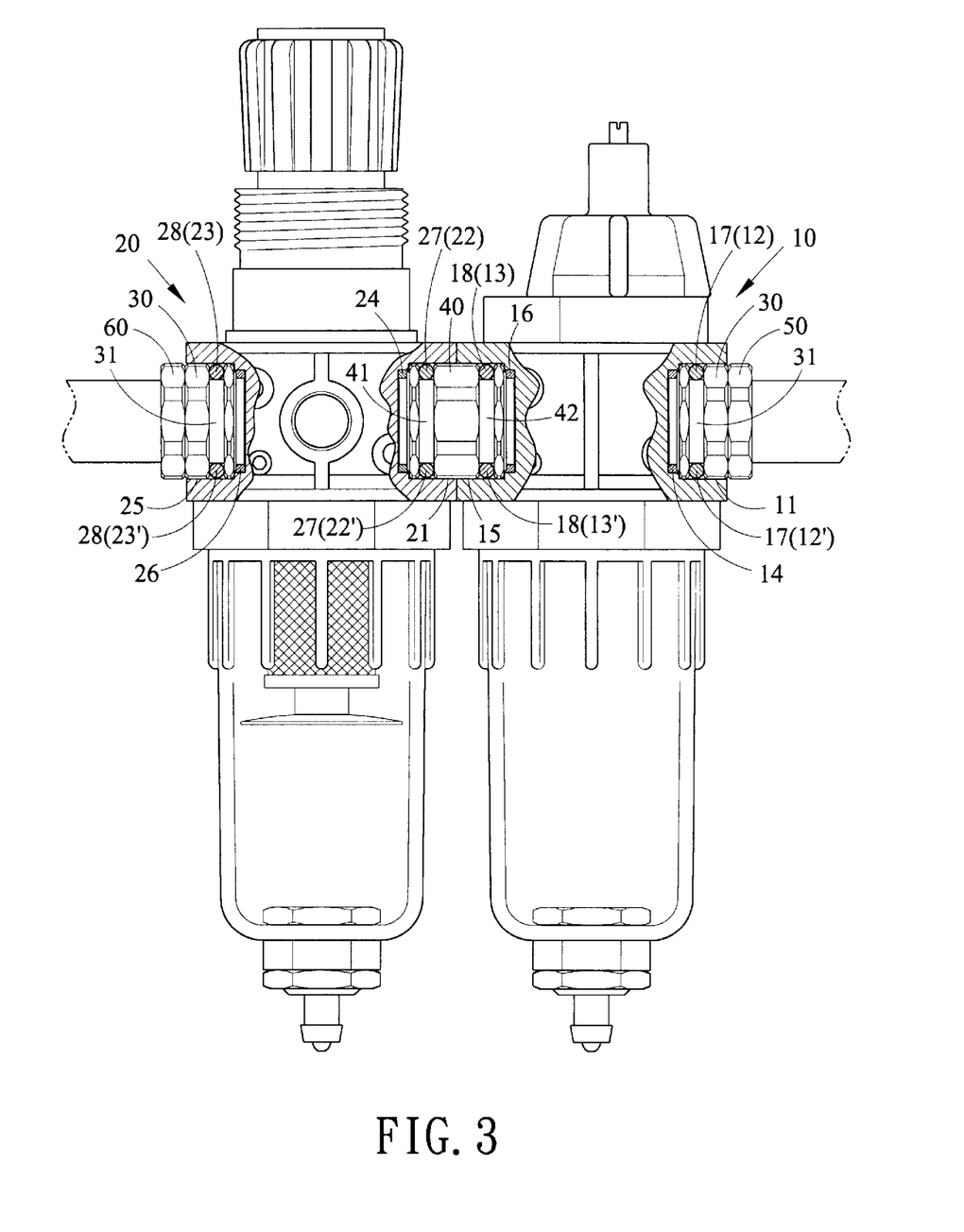
FIG. 3 is a side view in part section of the FIG. 1 device.

Referring to FIGS. 1, 2 and 3, there is shown a first preferred embodiment of linking device in accordance with the invention. The device functions to contiguously connect together a pair of or a plurality of fluid-conditioning units, such as pressure regulators, filters and lubricators for use in compressed air systems.

According to the first preferred embodiment of the invention, the device comprises a first body unit 10, a second body unit 20, two external coupling mechanisms 30, and an internal coupling mechanism 40. Each of above components will be described in detail below.

The first body unit 10 is configured to have two opposite apertures 11 and 15 on two opposite sides respectively, wherein aperture 11 is on a first side and aperture 15 is on a third side, each aperture being formed as a multi-sided member, a first O-ring 14 in the aperture 11, a second O-ring 16 in the aperture 15, a first top and bottom recesses 12 and 12' at one end of second side relative to aperture 11 for receiving a first fastening member 17, and a second top and bottom recesses 13 and 13' at the other end of second side relative to aperture for receiving a second fastening member 18.

The second body unit 20 is configured to have two opposite apertures 21 and 25 on both sides, wherein aperture 21 is on first side and aperture 25 is on second side, each aperture being formed as a multi-sided member, a first O-ring 24 in the aperture 21, a second O-ring 26 in the aperture 25, a first top and bottom recesses 22 and 22' at one end of second side relative to aperture 21 for receiving a first fastening member 27, and a second top and bottom recesses 23 and 23' at the other end of second side relative to aperture 25 for receiving a second fastening member 28.

Each external coupling mechanism 30 is a hollow cylindrical member and comprises a recessed ring 31 having a multi-sided edge on the outer surface fastened in the aperture 11 or 25 by the fastening member 17 or 28; and an threaded through hole 33.

The internal coupling mechanism 40 is a hollow cylindrical member and comprises a first recessed ring 41 and a spaced second recessed ring 42 both having a multi-sided edge on the outer surface fastened in the apertures 21 and 15 by the fastening members 27 and 18 respectively; and a through hole 43. The internal coupling mechanism 40 is fastened between the apertures 21 and 15 for securing the first and second body units 10 and 20 together. Also, one external coupling mechanism 30, already coupled to an externally threaded end 51 of a pipe 50, is fastened in the aperture 11. Likewise, another external coupling mechanism 30, already coupled to an externally threaded end 61 of another pipe 60, is fastened in the aperture 25. This forms a two-piece pipe linking device.

Referring to FIG. 3 specifically, an assembly of the first preferred embodiment is detailed below. In a first phase, insert first O-ring 14 in the aperture 11 of the first body unit 10. Then insert one external coupling mechanism 30 in the aperture 11 to engage with the first O-ring 14. Next, insert the first fastening member 17 in the first top and bottom recesses 12 and 12' until fastened in the recessed ring 31 of the external coupling mechanism 30. As a result, one external coupling mechanism 30 is fastened in the aperture 11 of the first body unit 10. In a second phase, insert second O-ring 16 in the aperture 15 of the first body unit 10. Then insert one end of the internal coupling mechanism 40 in the aperture 15 to engage with the second O-ring 16. Next, insert the second fastening member 18 in the second top and bottom recesses 13 and 13' until fastened in the second recessed ring 42. As a result, one half portion of the internal coupling mechanism 40 is fastened in the aperture 15 of the first body unit 10. In a third phase, insert first O-ring 24 in the aperture 21 of the second body unit 20. Then insert the other end of the internal coupling mechanism 40 in the aperture 21 to engage with the first O-ring 24. Next, insert the first fastening member 27 in the first top and bottom recesses 22 and 22' until fastened in the first recessed ring 41 of the internal coupling mechanism 40. As a result, the other half portion of the internal coupling mechanism 40 is fastened in the aperture 21 of the second body unit 20 and thus the first and second body unit 10 and 20 are fastened together with the through hole 43 in communication therebetween. In a fourth phase, insert second O-ring 26 in the aperture 25 of the second body unit 20. Then insert the other external coupling mechanism 30 in the aperture 25 to engage with the second O-ring 26. Next, insert the second fastening member 28 in the second top and bottom recesses 23 and 23' until fastened in the recessed ring 31. As a result, the other external coupling mechanism 30 is fastened in the aperture 25 of the second body unit 20. In a final fifth phase, drive the externally threaded ends 51 and 61 of pipes 50 and 60 into the threaded through holes 33 of both external coupling mechanisms 30 for securing pipes 50 and 60 to the linking device.

Note that there are provided an air channel 110 in the aperture 11 of the first body unit 10 (see FIG. 2) and another air channel (not shown) in the aperture 15 of the first body unit 10. Likewise, there are provided an air channel 210 in the aperture 21 of the second body unit 20 and another air channel (not shown) in the aperture 21 of the second body unit 20. It is envisaged that the air-tightness of the linking device is well maintained by the provision of O-rings. It is also noted that the first and second body unit 10 and 20 can have the same construction for reducing the cost of preparing dies of components.

Figure 4:
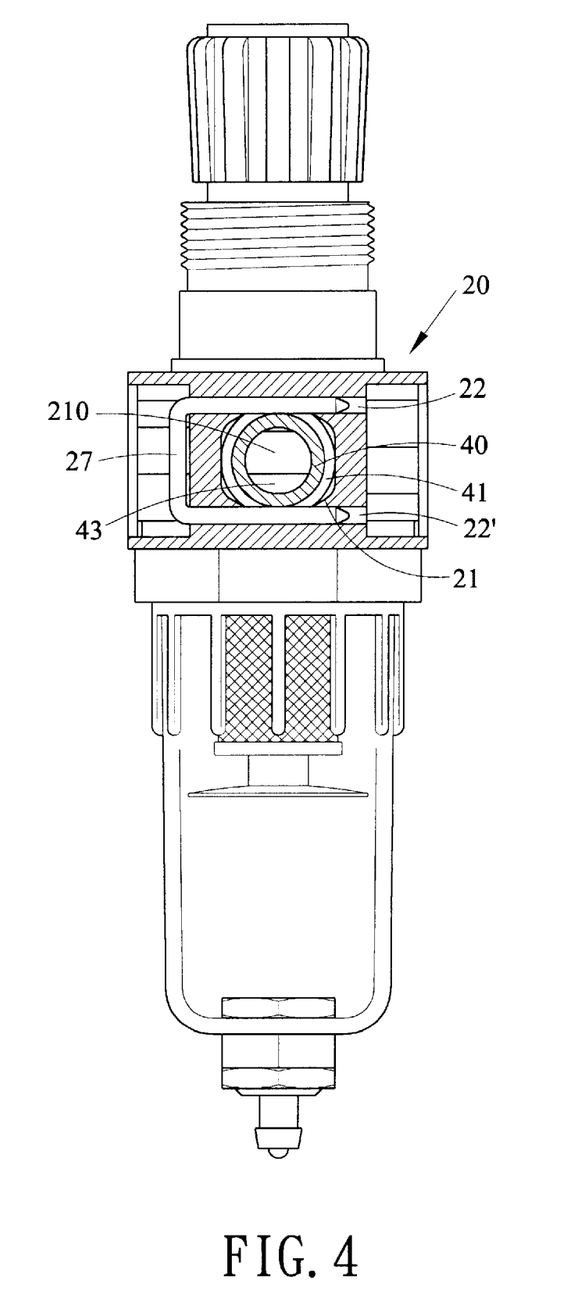
FIG. 4 is a side view in part section of the internal coupling mechanism fastened in the aperture of the second body unit.

Referring to FIG. 4, there is shown that the other half portion of the internal coupling mechanism 40 is fastened in the aperture 21 of the second body unit 20.

Figure 5:
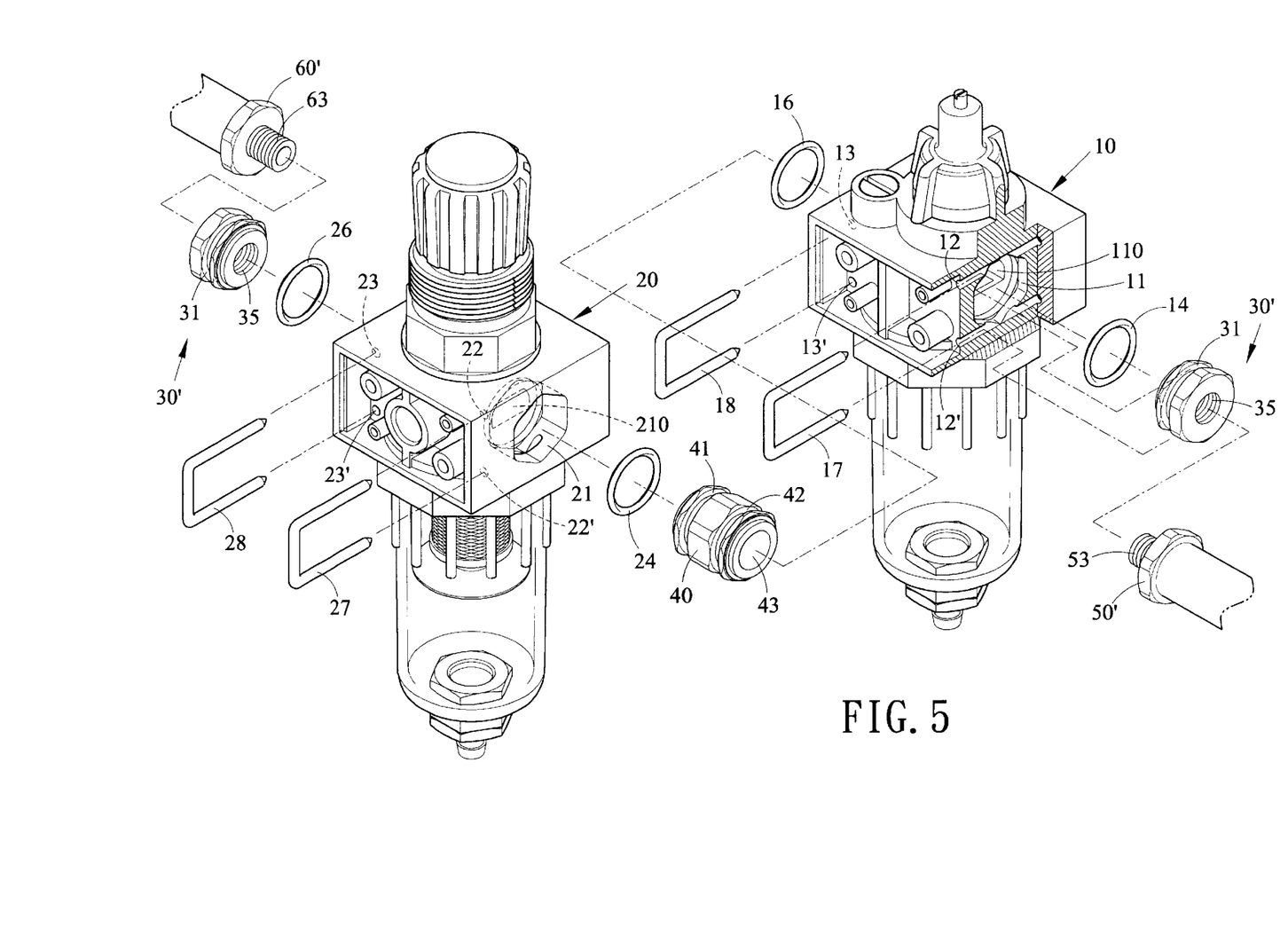
FIG. 5 is an exploded perspective view in part section showing the linking device having two external coupling mechanisms with different threaded holes.

Referring to FIG. 5, there is shown the linking device having two external coupling mechanisms 30' with different threaded through holes 35 being adapted to link to externally threaded ends 53 and 63 of pipes 50' and 60' of different diameters respectively. Thus, it is possible of coupling the device of the invention to a variety of pipes of the fluid-conditioning units by simply replacing the original external coupling mechanisms with new ones having mated threaded through holes by removing the fastening members 17 and 28 from the top and bottom recesses 12, 12', 23, and 23' first. Likewise, a replacement of the original internal coupling mechanism is made possible by removing the fastening members 18 and 27 from the top and bottom recesses 13, 13', 22, and 22'. In other words, there is no need to replace the whole linking device with another one for such coupling.

Figure 6:
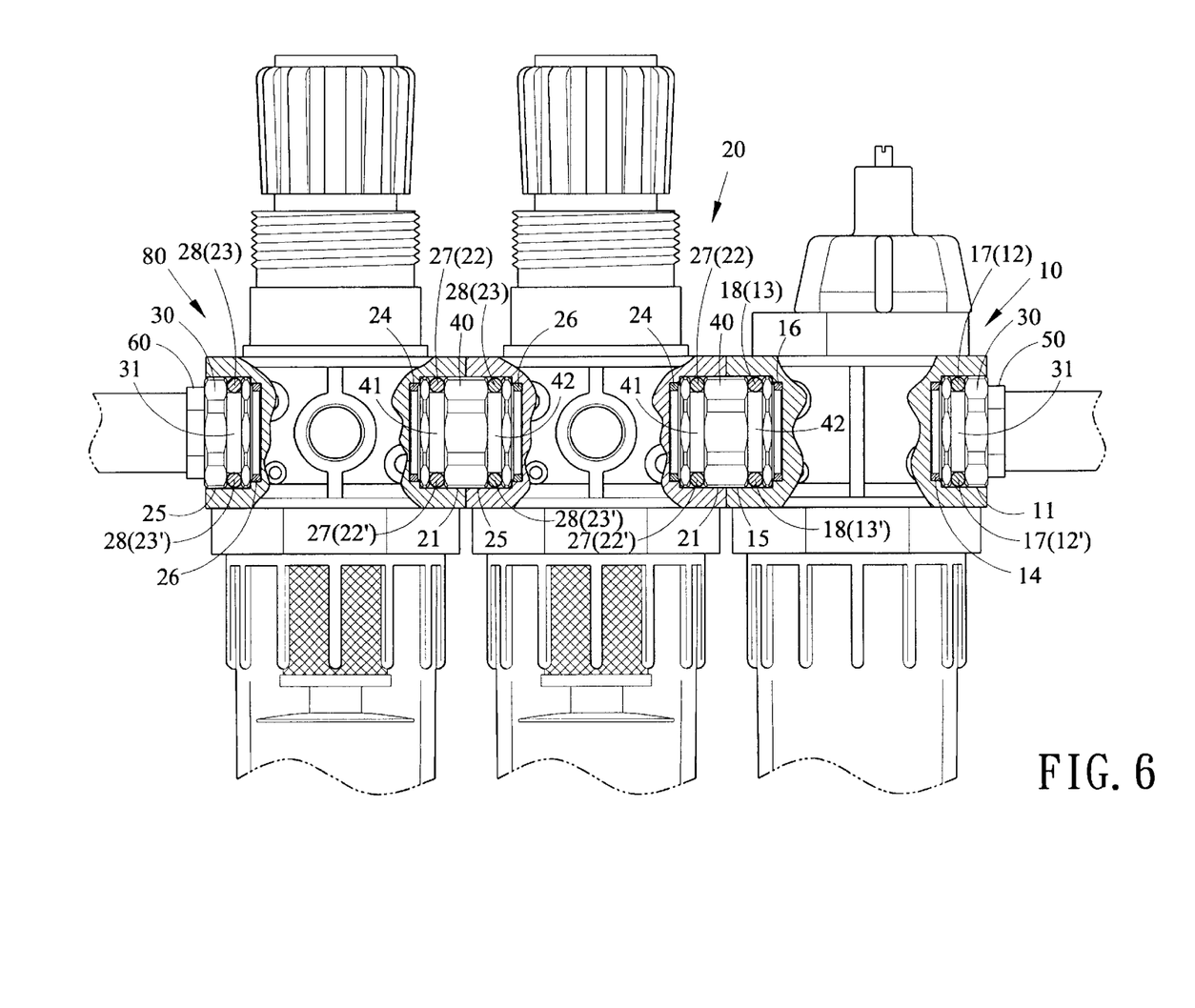
FIG. 6 is a side view in part section of a second preferred embodiment of linking device according to the invention.

Referring to FIG. 6, there is shown a second preferred embodiment of linking device according to the invention. The difference between first and second preferred embodiments is that the first one is a two-piece pipe linking device while the second one is a three-piece one. In the second preferred embodiment, one half portion of the second internal coupling mechanism 40 is fastened in the aperture 25 of the second body unit 20. The other half portion of the second internal coupling mechanism 40 is fastened to a third body unit 80. Further, the third body unit 80 is fastened to the other external coupling mechanism 30 which is coupled to the pipe 60. This forms a three-piece pipe linking device.

Figure 4A:
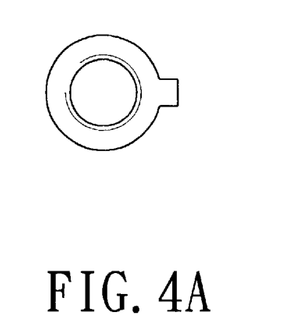
FIG. 4A is a side plan view showing another configuration of external coupling mechanism, internal coupling mechanism, or aperture.

Referring to FIG. 4A, there is shown another configuration of the external coupling mechanism 30, the internal coupling mechanism 40, or the aperture 11, 15, 21, or 25 each having a cross-section of square, hexagon, or circle having a keyway as shown.

While the invention herein disclosed has been described by means of specific embodiments, numerous modifications and variations could be made thereto by those skilled in the art without departing from the scope and spirit of the invention set forth in the claims.

What is claimed is:

1. A device for contiguously connecting together a pair of fluid flow elements, the device comprising:

a first body unit and a second body unit, each having a first side, a second side, a third side, and fourth side, a first aperture on the first side and a second aperture on the third side which is opposite to the first aperture;

a first external coupling mechanisms and a second external coupling mechanisms wherein the first external coupling mechanism has one end fastened in the first aperture of the first side of the first body unit and the other end thereof linked to an end of a first pipe, and the second external coupling mechanism has one end fastened in the second aperture of the third side of the second body unit and the other end thereof linked to an end of a second pipe; and an internal coupling mechanism having one end fastened in the second aperture of the third side of the first body unit and the other end thereof fastened in the first aperture of the first side of the second body unit, wherein each of the first and the second body units each further comprises a first top and bottom recesses provided on an end of the second side of each respective body unit and a second top and bottom recesses provided on the other end of the second side of each respective body unit, wherein each of the first and the second body units further comprises a first fastening member and a second fastening member on the second side of each of the body unit, the first fastening member being inserted into the first top and bottom recesses, and the second fastening member being inserted into the second top and bottom recesses.

2. The device of claim 1, wherein each of the first external coupling mechanisms comprises a recessed ring at one end having a multi-sided edge on an outer surface fastened in the first aperture on the first side of the first body unit and fastened in the second aperture on the third side of the second body unit by one of the first and second fastening members and a threaded through hole.

3. The device of claim 2, further comprising two second external coupling mechanisms each having a threaded through hole having a diameter different from that of the threaded through hole of the first external coupling mechanism for being adapted to link to a third or fourth pipe having a diameter different from that of the first or the second pipe when the first external coupling mechanisms are replaced with the second external coupling mechanisms.

4. The device of claim 1, wherein the internal coupling mechanism comprises a first recessed ring, a spaced second recessed ring, and a through hole, said first and second recessed rings both having a multi-sided edge on an outer surface, the first recessed ring fastened in the second aperture on the third side of the first body unit by the second fastening member of the first body unit and the second recessed ring fastened in the first aperture on the first side of the second body unit by the first fastening member of the second body unit.

5. The device of claim 1, wherein each aperture of each of the first and the second body units has an internal air channel, further comprising a plurality of O-rings one of which is inserted into each aperture of each of the first and the second body units prior to fastening the first and second external coupling mechanisms, the internal coupling mechanism, and the first and the second body units together for maintaining an air-tightness of the linking device.

6. The device of claim 1, wherein each of the first external coupling mechanisms, the internal coupling mechanism, or each of aperture has a cross-section of hexagon.

* * * * *